(12) United States Patent
Mahamuni et al.

(10) Patent No.: US 8,949,959 B2
(45) Date of Patent: Feb. 3, 2015

(54) REDUCED AUTHENTICATION TIMES FOR SHARED-MEDIA NETWORK MIGRATION

(75) Inventors: Atul B. Mahamuni, Fremont, CA (US); Carol Barrett, Palo Alto, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 353 days.

(21) Appl. No.: 13/400,991

(22) Filed: Feb. 21, 2012

(65) Prior Publication Data

US 2013/0219478 A1    Aug. 22, 2013

(51) Int. Cl.
*H04L 29/00* (2006.01)
(52) U.S. Cl.
USPC ............................................. 726/6; 370/254
(58) Field of Classification Search
USPC ............................................. 726/6; 370/254
See application file for complete search history.

(56) References Cited

U.S. PATENT DOCUMENTS

| | | | |
|---|---|---|---|
| 7,370,350 B1 | 5/2008 | Salowey | |
| 7,716,721 B2 | 5/2010 | Zavalkovsky et al. | |
| 7,969,945 B2 | 6/2011 | Navali et al. | |
| 8,023,478 B2 | 9/2011 | Cam-Winget et al. | |
| 8,102,814 B2 | 1/2012 | Rahman et al. | |
| 8,341,250 B2 | 12/2012 | Pritikin et al. | |
| 8,356,171 B2 | 1/2013 | Shatzkamer et al. | |
| 8,472,348 B2 * | 6/2013 | Hui et al. ...................... | 370/254 |

OTHER PUBLICATIONS

/Farah Kandah, Weiyi Zhang, Xiaojiang Du, Yashaswi Singh/ A Secure Key Management Scheme in Wireless Mesh Networks/2011/ pp. 1-5.*
Gnawali, et al., "The Minimum Rank Objective Function with Hysteresis", draft-ieft-roll-minrank-hysteresis-of-04, IETF Internet-Draft, May 2011, 11 pages.
Thubert, et al., "RPL Objective Function Zero", draft-ietf-roll-of0-15, IETF Internet-Draft, Jul. 2011, 14 pages.
Vasseur, et al., "Routing Metrics Used for Path Calculation in Low Power and Lossy Networks", draft-ietf-roll-routing-metrics-19, IETF Internet-Draft, Mar. 2011, 31 pages.
Winter, et al., "RPL: IPv6 Routing Protocol for Low Power and Lossy Networks", draft-ietf-roll-rpl-19, IETF Internet-Draft; Mar. 2011, 164 pages.

\* cited by examiner

*Primary Examiner* — Brandon Hoffman
*Assistant Examiner* — Michael D Anderson
(74) *Attorney, Agent, or Firm* — Parker Ibrahim & Berg LLC; James M. Behmke; Stephen D. LeBarron

(57) ABSTRACT

In one embodiment, a management device in a computer network determines when nodes of the computer network join any one of a plurality of field area routers (FARs), which requires a shared-media mesh security key for that joined FAR. The management device also maintains a database that indicates to which FAR each node in the computer network is currently joined, and to which FARs, if any, each node had previously joined, where the nodes are configured to maintain the mesh security key for one or more previously joined FARs in order to return to those previously joined FARs with the maintained mesh security key. Accordingly, in response to an updated mesh security key for a particular FAR of the plurality of FARs, the management node initiates distribution of the updated mesh security key to nodes having previously joined that particular FAR that are not currently joined to that particular FAR.

22 Claims, 13 Drawing Sheets

| NODE 610 | CURRENT FAR 620 (% 625) | PREVIOUS FAR(S) 630 (% 625) |
|---|---|---|
| 11 | FAR-A (100%) | - |
| 12 | FAR-B (100%) | - |
| 13 | FAR-C (100%) | - |
| 14 | FAR-C (100%) | - |
| ... | ... | ... |
| 23 | FAR-A (100%) | - |
| ... | ... | ... |
| 32 | FAR-A (100%) | - |
| ... | ... | ... |

DATABASE 600

FIG. 6

| NODE 610 | CURRENT FAR 620 (% 625) | PREVIOUS FAR(S) 630 (% 625) |
|---|---|---|
| 11 | FAR-A (100%) | - |
| 12 | FAR-B (100%) | - |
| 13 | FAR-C (100%) | - |
| 14 | FAR-C (100%) | - |
| ... | ... | ... |
| 23 | FAR-B (1%) | FAR-A (99%) |
| ... | ... | ... |
| 32 | FAR-A (100%) | - |
| ... | ... | ... |

DATABASE 600

FIG. 8

| NODE 610 | CURRENT FAR 620 (% 625) | PREVIOUS FAR(S) 630 (% 625) |
|---|---|---|
| 11 | FAR-A (100%) | - |
| 12 | FAR-B (100%) | - |
| 13 | FAR-C (100%) | - |
| 14 | FAR-C (100%) | - |
| ... | ... | ... |
| 23 | FAR-C (1%) | FAR-B (30%), FAR-A (69%) |
| ... | ... | ... |
| 32 | FAR-A (100%) | - |
| ... | ... | ... |

DATABASE 600

FIG. 10

REDUCED AUTHENTICATION TIMES FOR SHARED-MEDIA NETWORK MIGRATION

TECHNICAL FIELD

The present disclosure relates generally to computer networks, and, more particularly, node authentication for shared-media computer networks.

BACKGROUND

Field Area Routers (FARs) are routers in a computer network (e.g., a Smart Grid) that are installed in the field at various locations to provide communication between nodes of a local computer network (a field area network or FAN) and a central or wide area network (WAN). For example, on the "southbound," FARs may connect Low power and Lossy Networks (LLNs) domains that comprise a large number of devices such as sensors and actuators using low power shared-media links, such as wireless or powerline communication (PLC) links. On the "northbound," FARs communicate with the Utility Control Center using various wireless backhaul technologies such as 2G, 3G, LTE, WiMax, etc., as will be understood by those skilled in the art. In other words, FARs often act as "root nodes" through which all of the traffic transits between the local network to a control center, and thus play a critical role in the network infrastructure.

In a typical field area network, such as one configured for Advanced Metering Infrastructure (AMI) applications, a FAR may communicate with thousands of end-points (nodes) on the downlinks (access network) using an IP-based mesh network. The nodes themselves, which may be stationary nodes, may actually connect to one or more FARs depending on various factors such as their proximity, available signal strength, interference, availability of suitable neighbors, etc. In some areas, these factors change very often, and what has been observed in deployed networks is that as many as 35% of the nodes migrate (roam) to adjoining FARs on a daily basis.

A mesh network is typically secured using group-based encryption keys and these keys are initially forwarded to the mesh nodes using a known authentication scheme. The process of node authentication and network admission is quite expensive, especially in low bandwidth mesh networks, and the load on the security servers. It has been observed that authentication is a significant component of the time for a node to effectively join a network; a major issue considering that the joining time is a critical component for many service level agreements (SLAs).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example database structure;
FIG. 8 illustrates another example database structure;
FIG. 10 illustrates another example database structure.

DESCRIPTION OF EXAMPLE EMBODIMENTS

Overview

Figure 1:
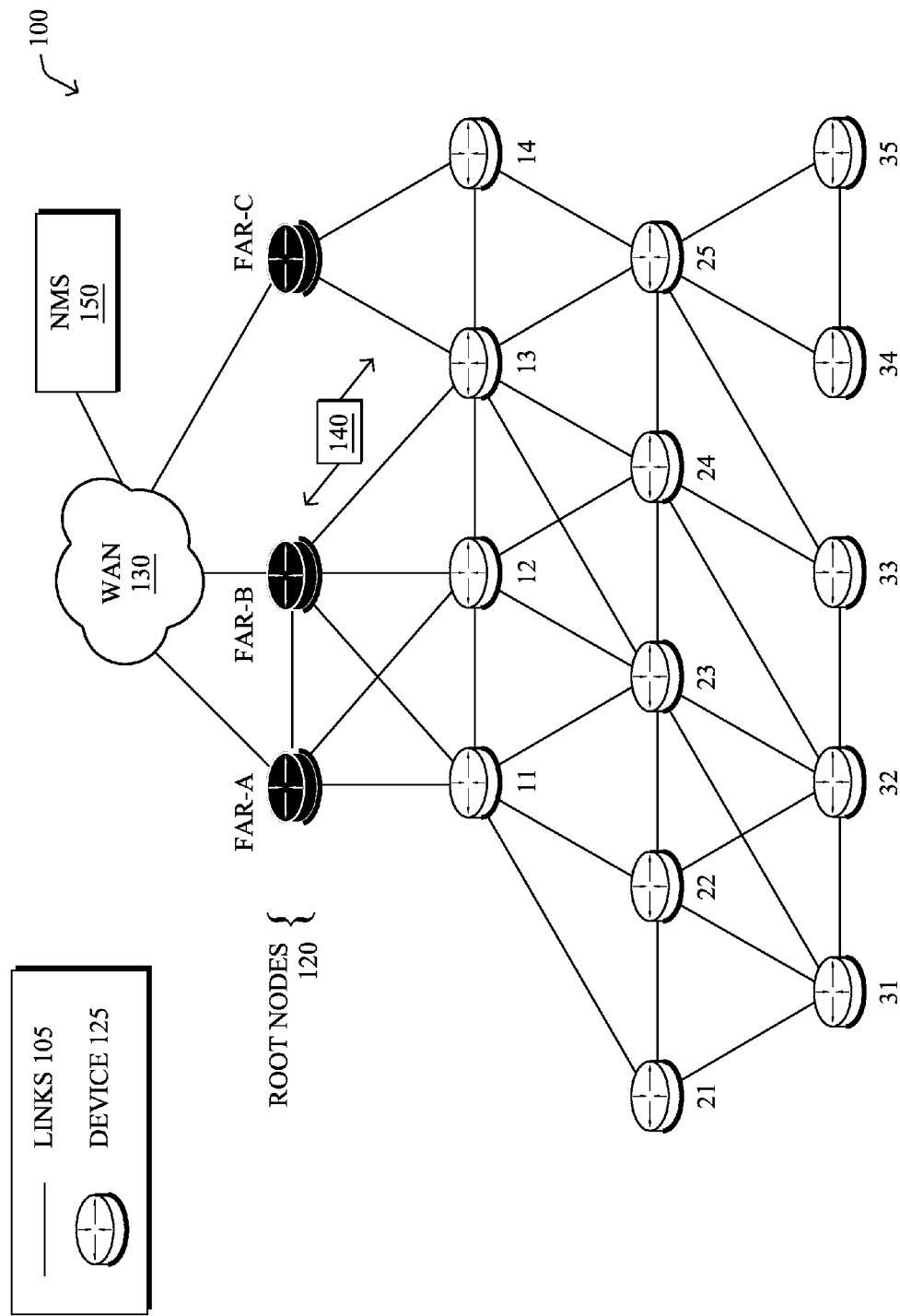
FIG. 1 illustrates an example computer network.

According to one or more embodiments of the disclosure, a management device in a computer network (e.g., a network management server) determines when nodes of the computer network join any one of a plurality of field area routers (FARs), which requires a shared-media mesh security key for that joined FAR. As such, the management device maintains a database that indicates to which FAR each node in the computer network is currently joined, and to which FARs, if any, each node had previously joined. The nodes themselves are configured to maintain the mesh security key for one or more previously joined FARs in order to return to (migrate back to) those previously joined FARs with the maintained mesh security key. Accordingly, in response to an updated mesh security key for a particular FAR of the plurality of FARs, the management node initiates distribution of the updated mesh security key to nodes having previously joined that particular FAR that are not currently joined to that particular FAR.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "11," "12," . . . "35", and described in FIG. 2 below) and a plurality of root nodes or field area routers (FARs) 120 (e.g., "A," "B," and "C") interconnected by various methods of communication. For instance, the links 105 may be shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, a management device 150, such as a network management server (NMS), head-end application, etc., may also be in communication with the computer network, such as via a WAN 130 or backhaul link to the FARs/root nodes, as shown. Those skilled in the art will understand that any number of nodes, devices, links, etc. may be used in the computer network, and that the view shown herein is for simplicity.

Data packets 140 (e.g., traffic and/or messages) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
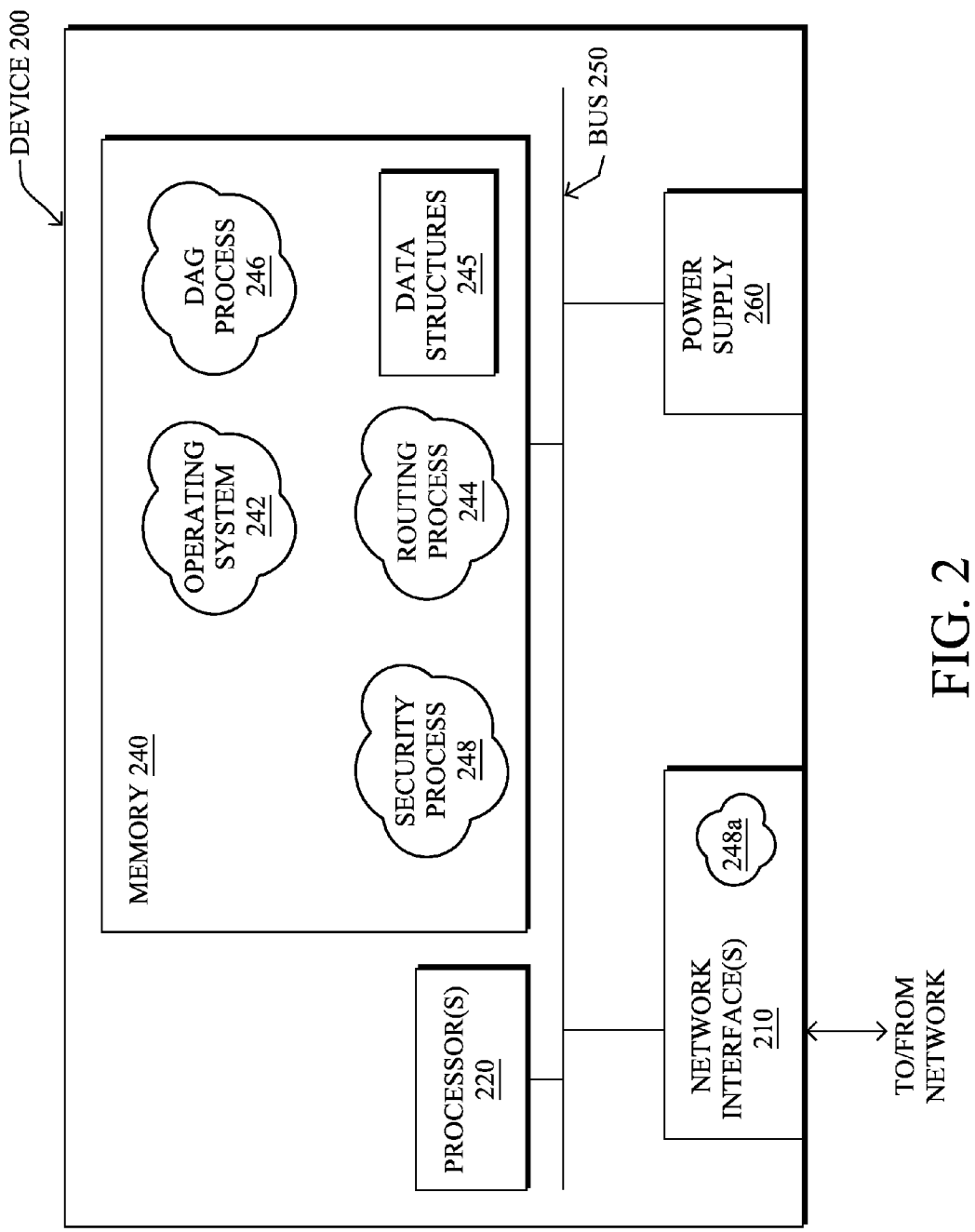
FIG. 2 illustrates an example network device/node.

FIG. 2 is a schematic block diagram of an example node/device 200 that may be used with one or more embodiments described herein, e.g., as any of the nodes 125 shown in FIG. 1 above, the FARs 120, or the network management device (e.g., NMS) 150. The device may comprise one or more network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols, particularly shared-media protocols (e.g., wireless, PLC, etc.) for nodes 125, and optionally a wired protocol for the management device 150 (and also optionally for the FARs/root nodes). That is, certain nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services on nodes 125 may comprise routing process/services 244, an optional directed acyclic graph (DAG) process 246, and an illustrative security process 248, as well as other various processes is not explicitly shown, such as for applications, etc., operating on the device. The management device 150 may also comprise an illustrative security process 248. Note that while security process 248 is shown in centralized memory 240, alternative embodiments provide for the process on nodes 125 (or FARs/root nodes 120) to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank is within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of 0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
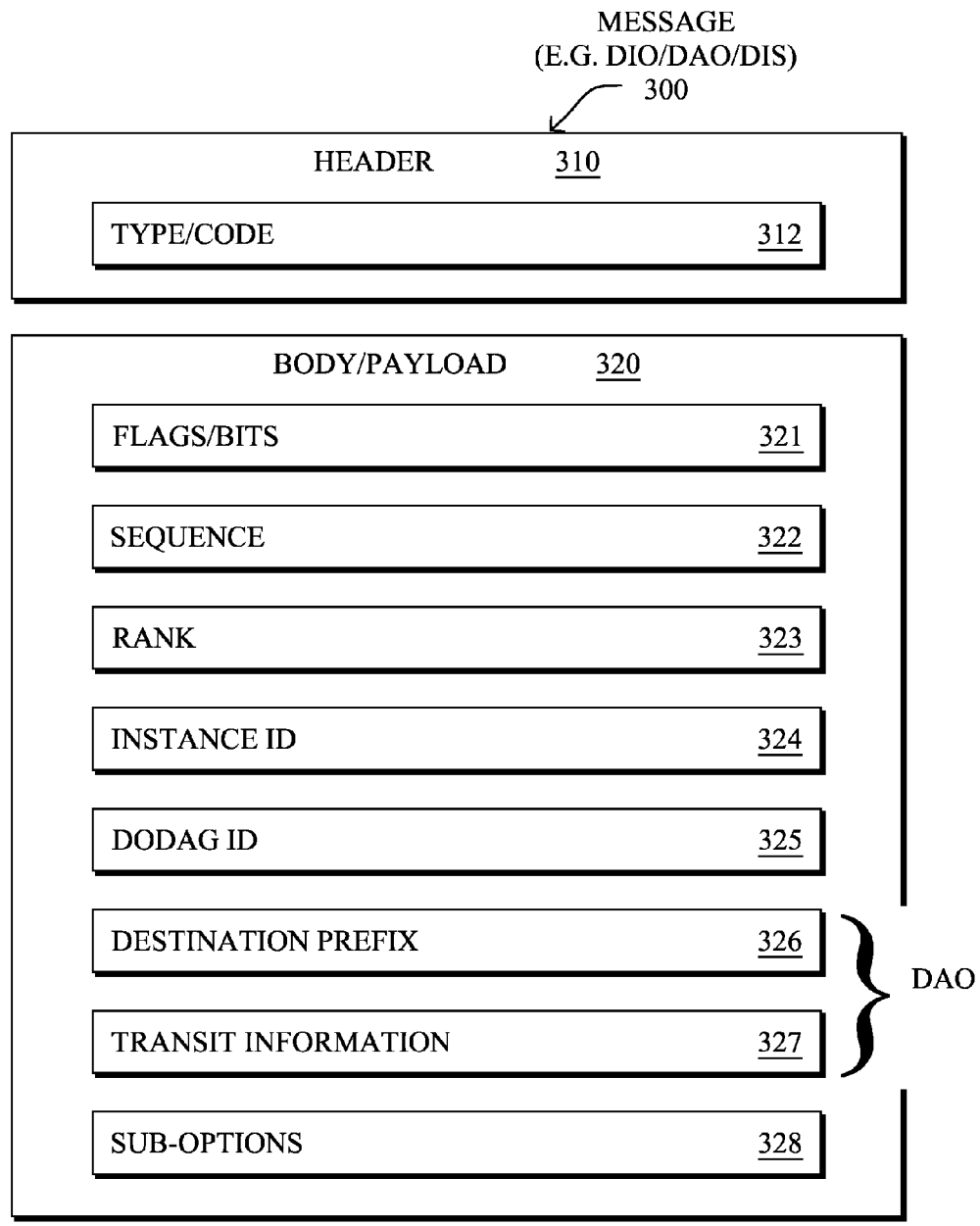
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
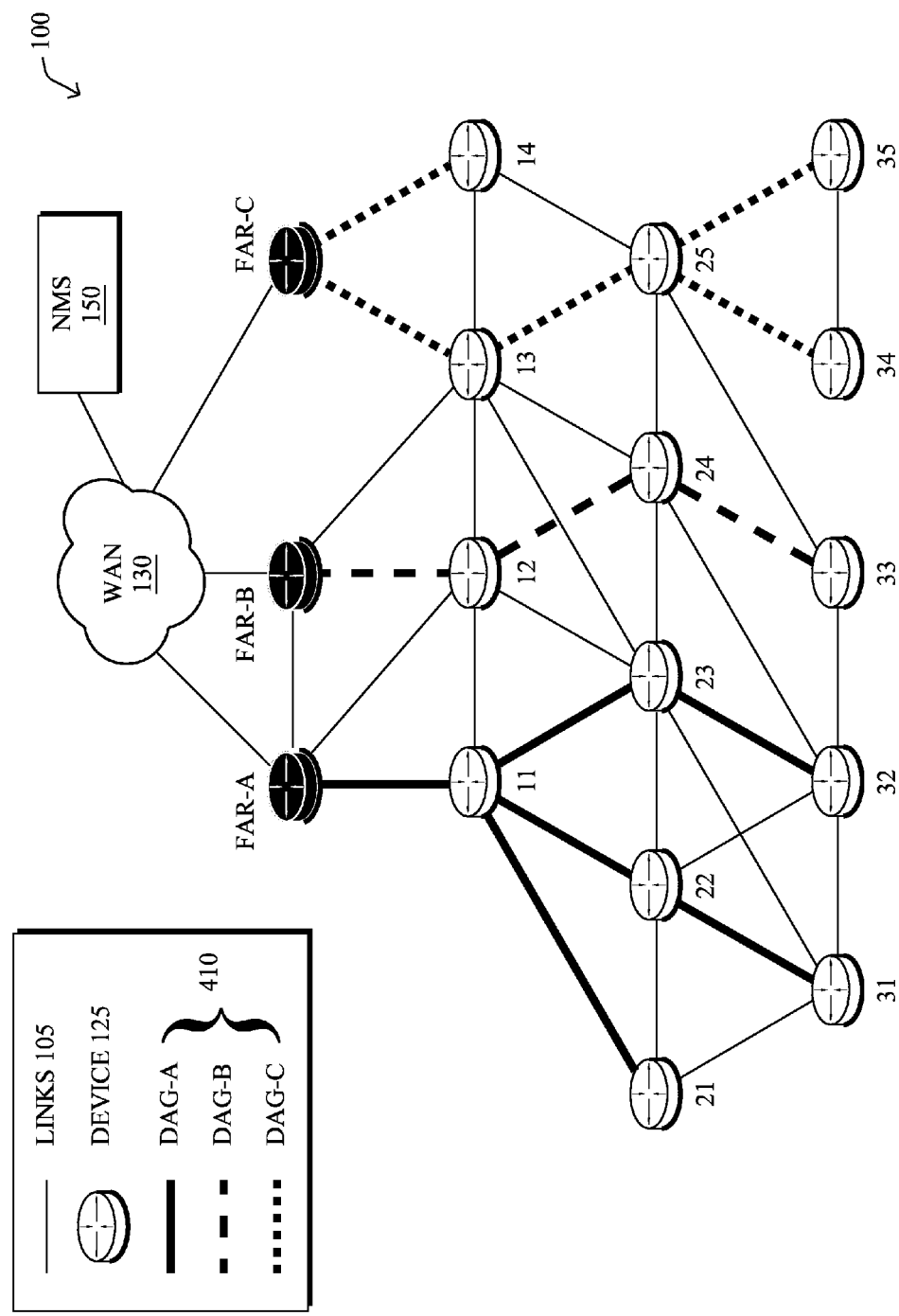
FIG. 4 illustrates an example of directed acyclic graphs (DAGs) in the computer network in FIG. 1.

FIG. 4 illustrates example simplified DAGs that may be created, e.g., through the techniques described above, within network 100 of FIG. 1, to each of the root nodes (FARs) 120. For instance, certain links 105 may be selected for each node to communicate with a particular parent (and thus, in the reverse, to communicate with a child, if one exists). These selected links form the DAGs 410, which extend from the root nodes toward one or more leaf nodes (nodes without children), e.g., DAG-A, DAG-B, and DAG-C. Traffic/packets 140 (shown in FIG. 1) may then traverse the DAGs 410 in either the upward direction toward the corresponding root or downward toward the leaf nodes, particularly as described herein. Note that while DAGs 410 is shown, other types of routing instances or topologies may be used herein, as may be appreciated by those skilled in the art. In addition, nodes 125 may simply communicate directly with the root nodes or FARs, and in such an embodiment, would not require the hierarchical communication created within the DAGs 410 as shown.

Network join/joining time is defined by the amount of time it takes a network node 125 to begin communicating with other nodes, and with the necessary application end-points. To reach this final end goal, a typical network node 125 must complete a number of steps:

1) Discover a network, referred to often as a field area network (FAN) or personal area network (PAN) (i.e., a specific network in IEEE 802.15.4 terminology);
2) Perform 802.1x-based mutual authentication and obtain link security keys (or other forms of authentication) for the corresponding FAR/network, such as from authentication, authorization and accounting (AAA) servers (note that unlike conventional WiFi Access Point (AP) roaming, such as where a node is moving from an AP to another one that is in the same subnet, the security keys across FARs are generally not the same);
3) Discover a route or routes (e.g., a default route, such as a DAG 410 by using RPL, which by itself involves a number of steps);
4) Configure a global IPv6 address (e.g. by using DHCPv6); and
5) Advertise the global IPv6 address to configure downward routes (e.g., by using RPL).

The ratio of nodes 125 devices to FARs 120 can typically be anywhere from 1000 to 5000 nodes for every FAR. As a result, each PAN will typically contain from 1000 to 5000 nodes. Furthermore, many LLN deployments can be dense, and nodes can easily have hundreds of neighbors. For these reasons, properly building a stable network topology can take tens of minutes, if not hours.

As noted above, in a typical field area network, such as one configured for Advanced Metering Infrastructure (AMI) applications, a FAR 120 may communicate with thousands of end-points (nodes 125) on the downlinks (access network) using an IP-based mesh network. The nodes themselves, which may be stationary nodes, may actually connect to one or more FARs depending on various factors such as their proximity, available signal strength, interference, availability of suitable neighbors, etc. In some areas, these factors change very often, and what has been observed in deployed networks is that as many as 35% of the nodes migrate (roam) to adjoining FARs on a daily basis.

A mesh network is typically secured using group-based encryption keys and these keys are initially forwarded to the mesh nodes using a known authentication scheme. The process of node authentication and network admission is quite expensive, especially in low bandwidth mesh networks, and the load on the security servers. It has been observed that authentication is a significant component of the time for a node to effectively join a network; a major issue considering that the joining time is a critical component for many service level agreements (SLAs).

Reduced Authentication Times

The techniques herein may eliminate re-authentication when a node moves to another FAR, if that node has been previously authenticated by that particular FAR. In particular, an automated system herein "learns" the network behavior over time, feeding a database that reflects the temporal migrating (roaming) patterns of nodes amongst the FARs. In this manner, updates to shared-media security mesh keys may be distributed to nodes for FARs (networks/LLNs) that those nodes may join in order to reduce the corresponding joining time, thus allowing devices to begin communicating at the application layer as quickly as possible. This may also be used to potentially influence the FAR/network selection process.

Specifically, according to one or more embodiments of the disclosure as described in detail below, a management device in a computer network (e.g., NMS 150) determines when nodes of the computer network join any one of a plurality of FARs, which requires a shared-media mesh security key for that joined FAR. As such, the management device maintains a database that indicates to which FAR each node in the computer network is currently joined, and to which FARs, if any, each node had previously joined. The nodes themselves are configured to maintain the mesh security key for one or more previously joined FARs in order to return to (migrate back to) those previously joined FARs with the maintained mesh security key. Accordingly, in response to an updated mesh security key for a particular FAR of the plurality of FARs, the management node initiates distribution of the updated mesh security key to nodes having previously joined that particular FAR that are not currently joined to that particular FAR.

Illustratively, the techniques described herein may be performed by hardware, software, and/or firmware, such as in accordance with the security process 248/248a, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the various shared-media authentication protocols (e.g., IEEE Std. 802.1x based authentication schemes) or routing protocols (e.g., RPL), and as such, may be processed by similar components understood in the art that execute those protocols, accordingly.

In general, one goal of the techniques herein is to pre-provision the mesh security key(s) of "adjoining" FARs in potentially interested nodes based on a migration database. However, determining "adjoining" FARs is difficult, because whether FARs are adjoining depends greatly on the topology, local interference patterns, etc., and because the network itself constantly changes, as new nodes and new FARs get installed/removed. As such, managing the configuration of adjoining FARs in a constantly changing environment is very error-prone, with dramatic consequences for mistakes.

Figure 5:
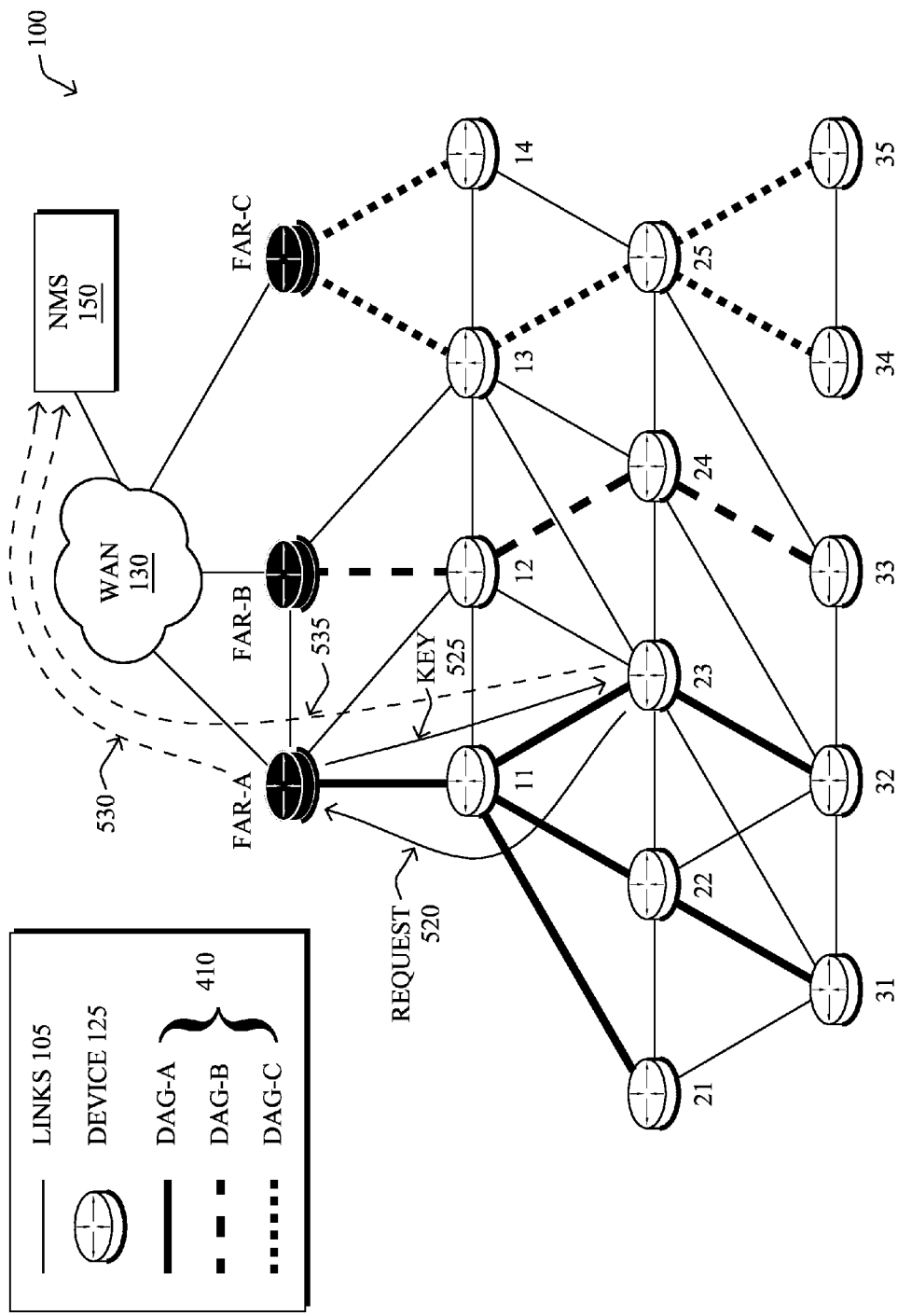
FIG. 5 illustrates an example message exchange for authentication when joining a DAG.

Operationally, the techniques herein address this problem by automating the process in the following fashion. According to a first component of the techniques herein, a management device in the network, such as the NMS 150, is configured to determine when nodes of the computer network join any one of a plurality of FARs, which requires a shared-media mesh security key for that joined FAR. For example, as shown in FIG. 5, when a node 125 (e.g., node 23) joins a FAR for the first time (FAR-A via node 11, thus joining network/DAG-A), it may perform a conventional authentication procedure to request authentication (request 520) in order to receive the mesh security key 525 (a.k.a. a group key) for FAR-A.

In one embodiment, the security process 248 of the management device (or other device hosting the application in the head-end network) monitors this event through communication with the FAR (message 530) or from the joining node itself (message 535). For example, such messages may be explicit notifications of the join event, or else may be messages meant for other protocols (e.g., Constrained Application Protocol, or "CoAP" messages), from which the management device may inferring when nodes join a FAR (i.e., based on implicit notification).

By registering these events, the management device may build and maintain a database (e.g., a data structure 245) that indicates to which FAR each node in the computer network is currently joined, and to which FARs, if any, each node had previously joined. For example, as shown in FIG. 6, an illustrative database 600 is shown, comprising a list of nodes in field 610 (only some nodes 125 shown for clarity), their corresponding currently joined FAR in field 620, and a list of their previously joined FAR(s) in field 630. Notably, the database structure shown is merely one example, and those skilled in the art will appreciate that any alternative structure may be used, such as organizing the database by FAR, separating each field into a plurality of corresponding fields, etc., and the view shown in FIG. 6 is not meant to limit the scope of the embodiments herein.

As shown in the database 600, node 23 is currently joined to its connected FAR, FAR-A, and has no other previous FARs. An optional sub-field 640 (associated with each FAR entry) additionally indicates "100%", which is a value generally indicating how often the corresponding node has been associated with (joined to) a particular FAR in relation to the other FARs. Such values, for instance, may be computed relative to the total time "Node-n" is seen by the NMS as being attached to a given FARs. For example, the management device may maintain, within the database, what portion of active time each node has spent joined to particular FARs (e.g., a percent, a time value, etc.), or what portion of total joins each node has joined particular FARs (e.g., a percent, a number, a ratio, etc.) within a specified past time period. Since FAR-A is node 23's first FAR, the value in FIG. 6 indicates that 100% of the time, node 23 has been joined to FAR-A.

Figure 7:
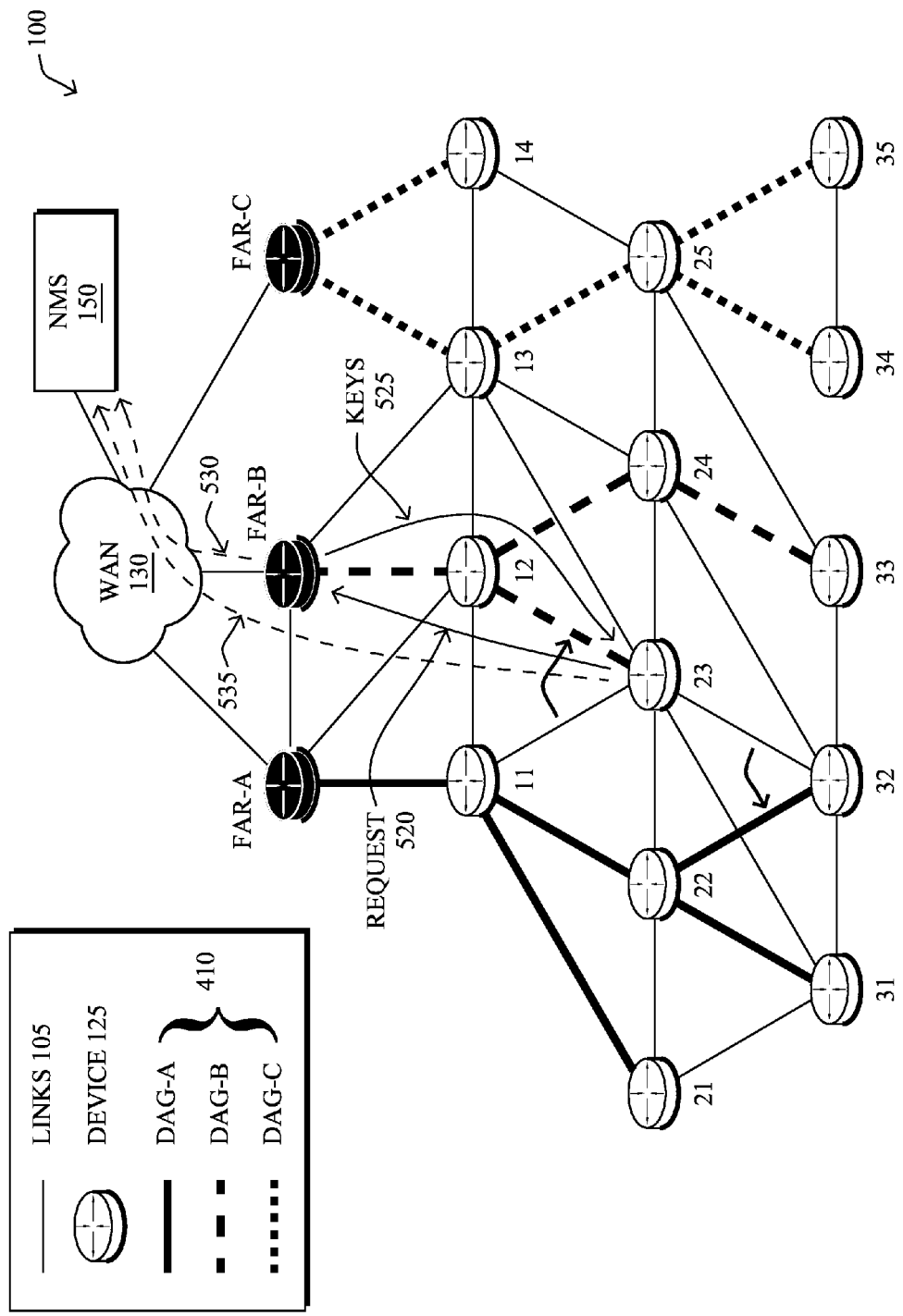
FIG. 7 illustrates another example message exchange for authentication when joining a DAG.

Now suppose that after some time, as shown in FIG. 7, node 23 migrates/roams to an adjoining FAR, FAR-B, via node 12. (Note, the term "roam" may be misleading, since many network nodes 125 are stationary, and thus "migrate" from one network/FAR to another based on varying network conditions and/or for load balancing purposes.) Again, since FAR-B does not know anything about node 23 yet, node 23 goes through a full authentication cycle, and it receives the security key(s) for FAR-B (which consumes time and resources). The network management device 150, upon detecting this migration as noted above, may then update the database 600 as shown in FIG. 8, such that node 23's current FAR is FAR-B (e.g., 1%, having just joined), and now the previously visited column for node 23 is populated with FAR-A (e.g., 99%).

Note that any child nodes (e.g., node 32) that was originally utilizing node 23 may generally "stay behind" with the previous FAR (e.g., FAR-A), but through a new parent (e.g., node 32 reselecting node 22 as its parent for DAG-A, as shown in FIG. 7). Alternatively, the child nodes may follow their migrating parent nodes, and as such, require the key(s) for their parent's joined FAR/network.

If, after some additional time, the node 23 migrates back to FAR-A once again, then it does not have to re-authenticate with FAR-A since it already has the mesh security key(s) for FAR-A. In particular, as noted, the nodes 125 maintain a respective shared-media mesh security key for previously joined FARs when migrating to a current FAR in order to return to those previously joined FARs with the maintained mesh security key. Note that in this instance, that is, using a cached mesh key (without the authentication process), the network management node may still be aware of the migration due to the notifications (explicit or implicit) as noted above.

Figure 9:
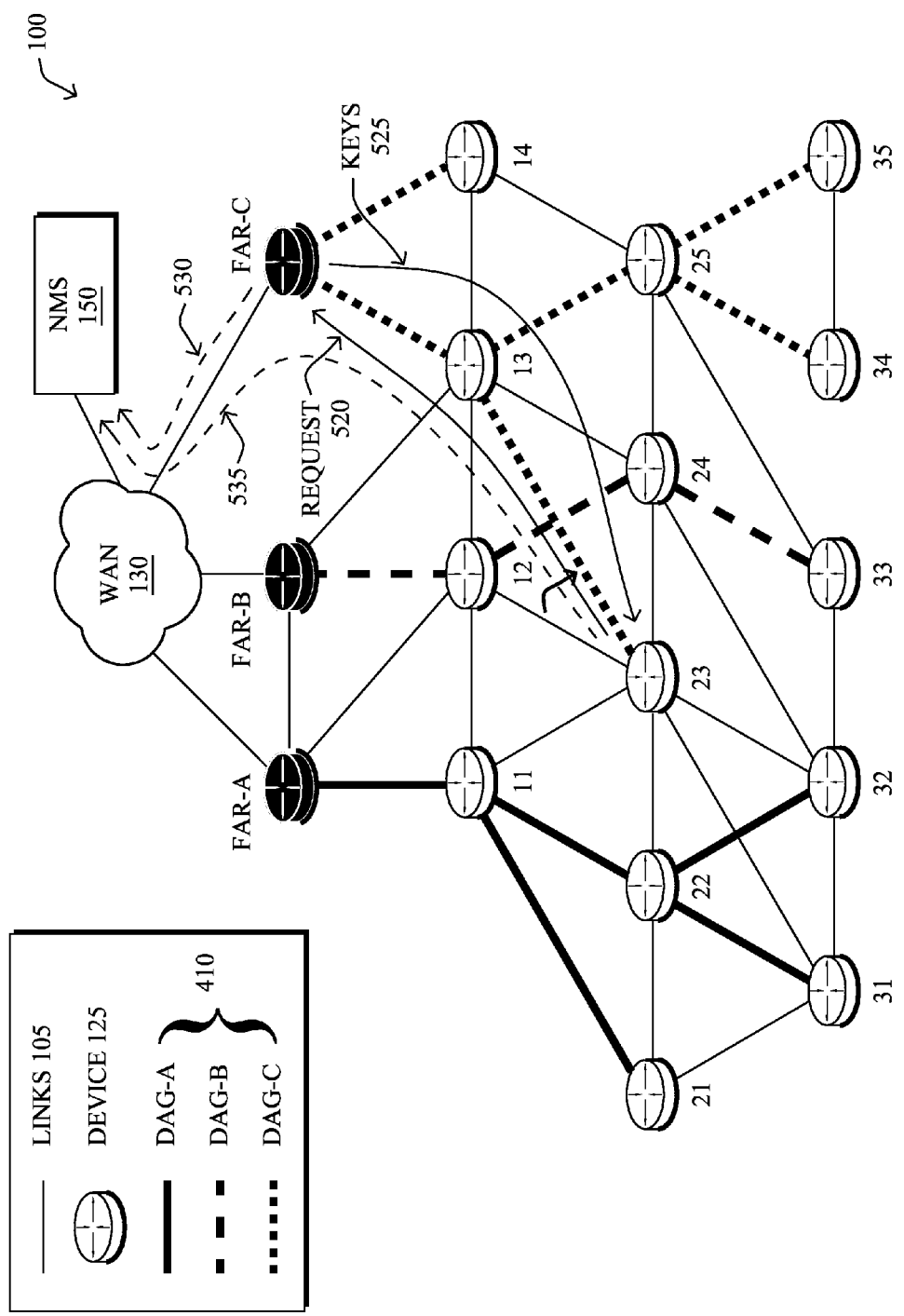
FIG. 9 illustrates another example message exchange for authentication when joining a DAG.

Similarly, if the node 23 migrates to yet another FAR (e.g., FAR-C) via node 13, as shown in FIG. 9, and assuming it is the first time with this new FAR, then the node performs another full authentication to receive the associated security keys, and the database 600 at the network management device 150 tracks this event as shown in the updated database 600 in FIG. 10. In particular, the currently connected FAR is FAR-C (e.g., 1%), and the previously visited FARs may now be FAR-B (e.g., 30%) and FAR-A (e.g., 69%).

Since the node 23 maintains the mesh keys for its previously joined FARs, as node 23 migrates between FARs A, B, and C, it may already have the mesh security keys for all three FARs, and does not need to go through full re-authentication during migration. However, with conventional techniques, should any of the mesh security keys of these FARs change (a mesh key rollover), then when migrating back to those FARs, the cached security key will not match, and the node will be forced to re-authenticate to obtain the updated security key.

According to the techniques described herein, therefore, in response to an updated mesh security key for any of the managed FARs (e.g., in the example, any of FAR-A, FAR-B, or FAR-C), then the management device initiates distribution of the updated mesh security key to nodes having previously joined that particular FAR that are not currently joined to that particular FAR. In other words, if FAR-A's mesh security keys get rolled over, the new key/keys is/are delivered to those nodes that have FAR-A as a previously joined FAR. This list of nodes may be discovered by consulting the previous FARs column/field 630 in database 600.

Figure 11:
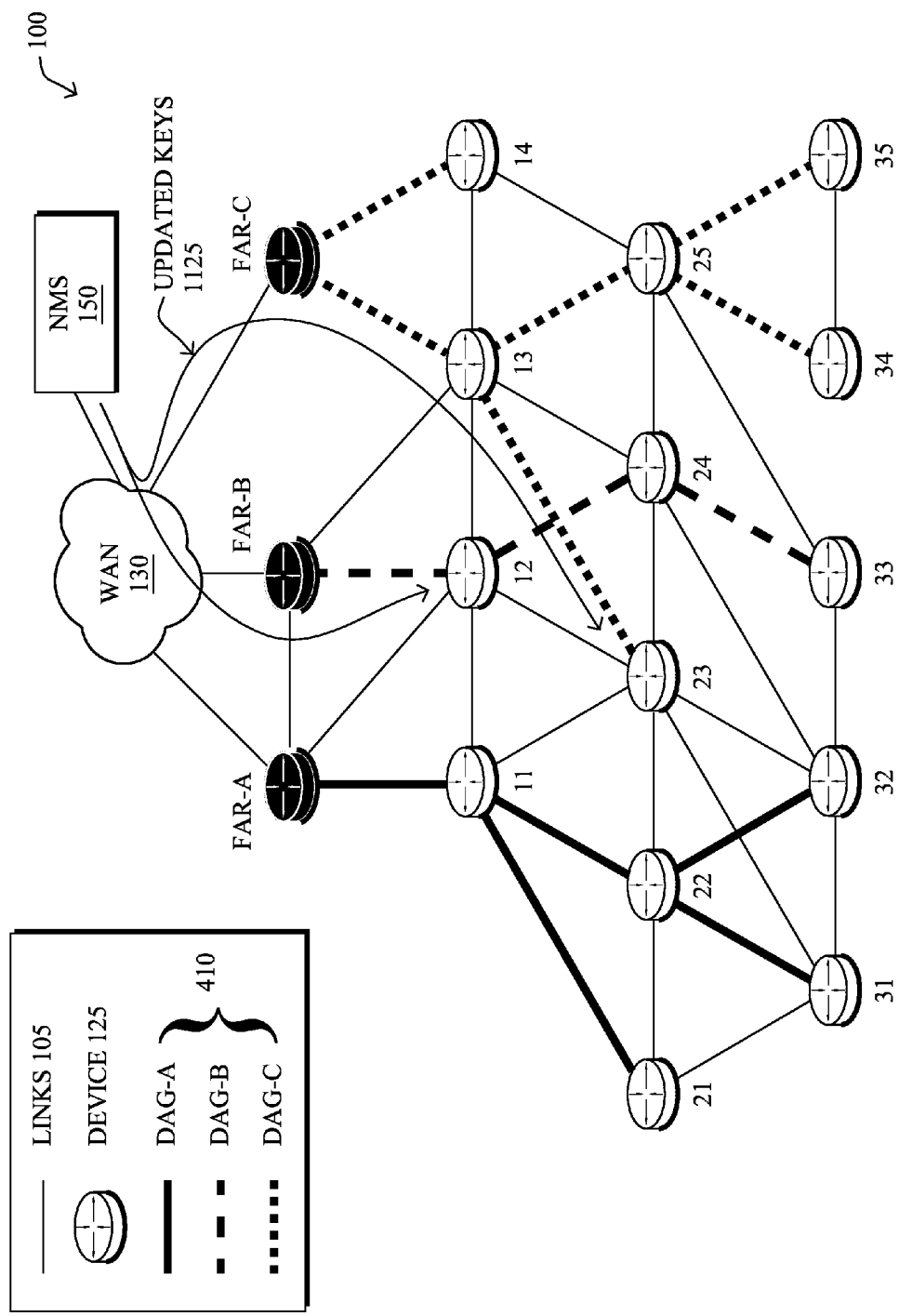
FIG. 11 illustrates an example distribution of mesh security keys.

As shown, for example, in FIG. 11, the NMS 150 (or a node directed by the NMS 150) may use in-band signaling, multicast messages, unicast messages, out-of-band signaling, etc., to distribute updated mesh security keys 1125 for a particular FAR to one or more nodes that had previously joined that particular FAR. For example, if FAR-A's keys are rolled over (changed/updated), then node 23, having been with FAR-A in the relevant past, may receive the updated key, such that if migrating back to the particular FAR (FAR-A), the node (node 23) may use the updated, and thus generally up-to-date, mesh security key, in order to avoid re-authentication, even with the updated keys while not connected to that particular network. Note also that as shown, node 12 may also have been previously joined to FAR-A, and as such, also received the updated key(s) 1125.

Notably, one or more administrative policies may be used to tune/limit the amount of updating mesh key communication. As an example, a policy could be set to limit the distribution of updated keys to specific nodes having previously joined that particular FAR within a specified past time period, e.g., in the last 48 hours. Another example is to limit the distribution only to specific nodes having previously joined that particular FAR for greater than a certain portion of their active time, e.g., those nodes that have spent greater than "X"% of their time with that particular FAR (and thus potentially that has greater than X% probability of returning to that FAR). Such policies may limit the distribution to fewer than all nodes that might need the updated keys, yet it allows for efficient migration of nodes between FARs.

Note further that the management device may disassociate a lesser-used FAR from a particular node within the database 600 in response to a portion of active time that particular node has spent joined to the lesser-used FAR being less than a configured portion. Said differently, if a node has not joined a particular FAR in quite some time (e.g., less than 1% or 5% of its time), that previously visited FAR may be removed from that node's entry in its previous FAR field 630.

As one additional consideration, as nodes are evicted from the network due to suspected compromise, they may also be deleted from the database 600, in addition to other security procedures taken in conventional operation (to prevent potential security holes). For example, if a particular node (e.g., node 35) has been evicted from the computer network, then correspondingly the management device may remove the particular node (node 35) from the database.

In accordance with one or more embodiments herein, a decision parameter may be added in the routing selection process to account for whether the node has the mesh security key for the potentially new FAR/network (i.e., implying a shorter set-up time). That is, while as of today, nodes select their FAR/network based on path quality, routing metrics, load balancing, etc. According to the techniques herein, a particular FAR may thus be selected for migration based on having an up-to-date mesh security key for the particular FAR (e.g., not simply cached, which may be out-of-date).

Figure 12:
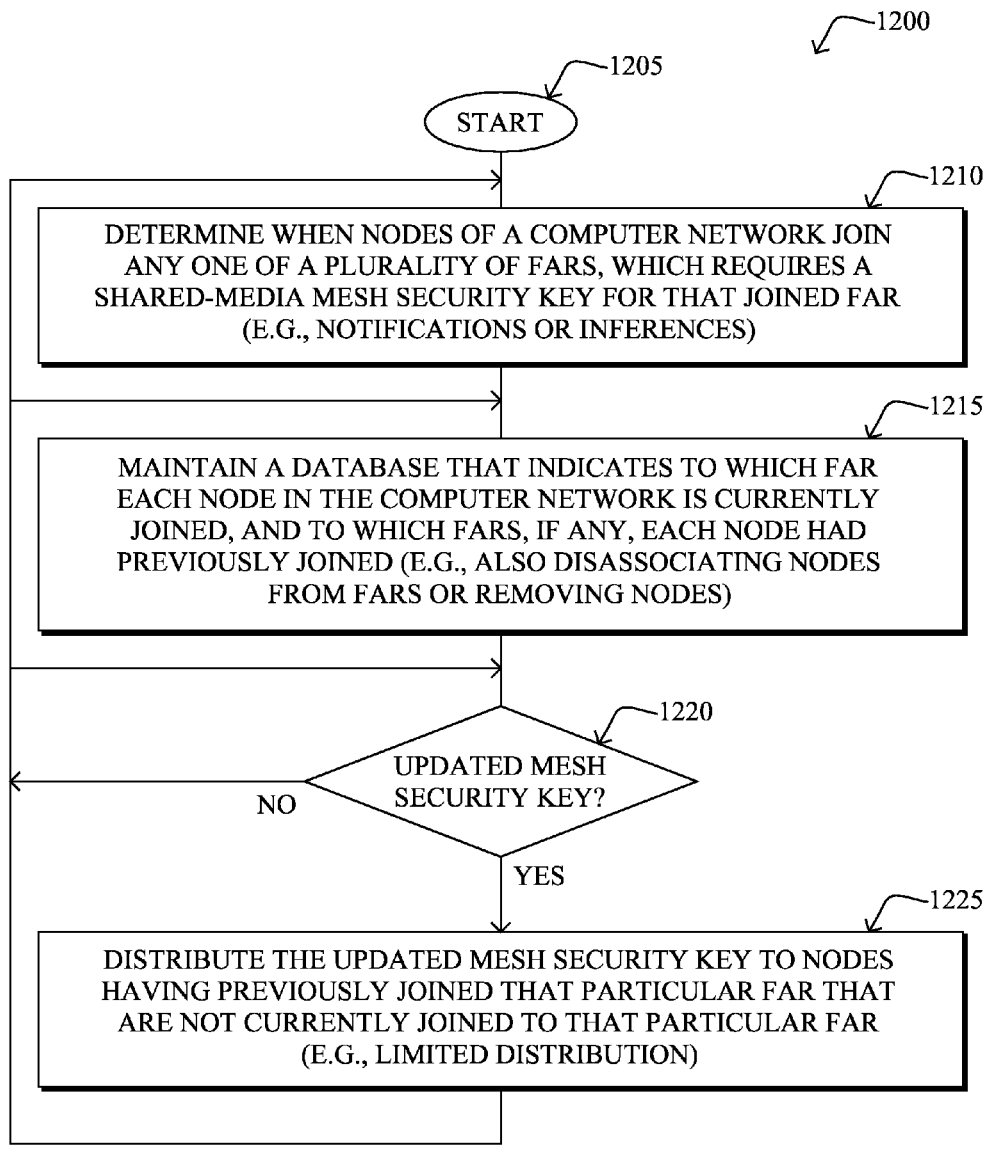
FIG. 12 illustrates an example simplified procedure for reduced authentication times for shared-media network migration from the perspective of a network management device.

FIG. 12 illustrates an example simplified procedure for reduced authentication times for shared-media network migration in accordance with one or more embodiments described herein, particularly from the perspective of the network management device (e.g., NMS) 150. The procedure 1200 may start at step 1205, and continues to step 1210, where, as described in greater detail above, a management device (NMS) 150 determines when nodes 125 of a computer network join any one of a plurality of FARs 120, which requires a shared-media mesh security key 525 for that joined FAR. For example, as described above, the management device may receive explicit notifications, or else may infer the joining through other implicit messages, as mentioned above. In step 1215, the management device maintains a database 600 that indicates to which FAR each node in the computer network is currently joined, and to which FARs, if any, each node had previously joined. Note that maintenance may also comprise disassociating nodes from FARs after a period of time or after the FARs have been used very little. Maintenance may also comprise removing evicted nodes from the database, as noted above.

In response to an updated mesh security key in step 1220 for any of the managed FARs, the management device may correspondingly distribute the updated mesh security key in step 1225 to those nodes having previously joined that particular FAR that are not currently joined to that particular FAR. As described in detail above, the distribution may be limited, such as based on the percentage of time each node has been actively joined with a particular FAR, etc. Note that the procedure 1200 illustratively continues to monitor and determine node migration, and continues to update migratory nodes of updated security keys which might be useful in future migrations, as detailed above.

Figure 13:
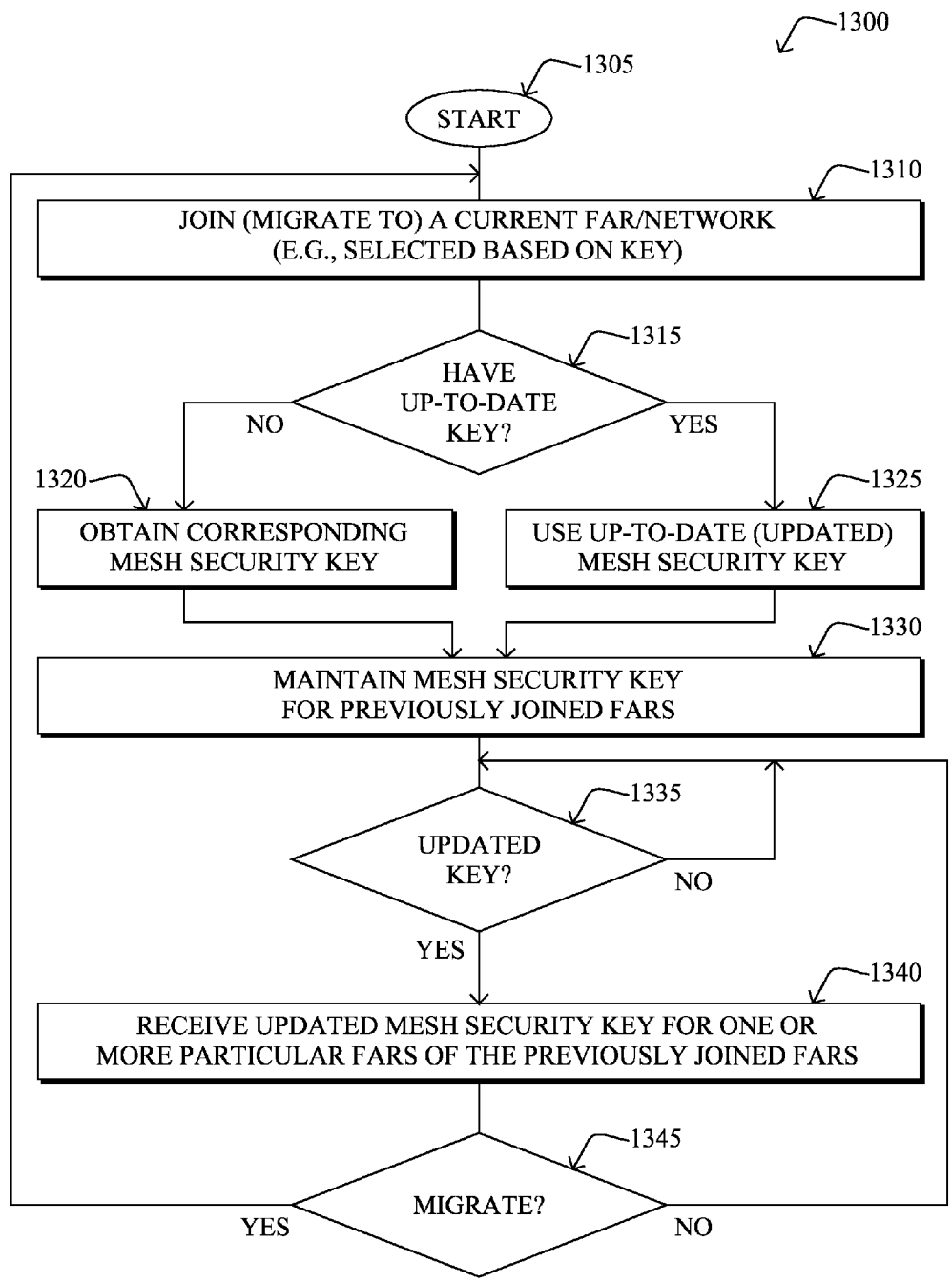
FIG. 13 illustrates another example simplified procedure for reduced authentication times for shared-media network migration from the perspective of a network node.

In addition, FIG. 13 illustrates another example simplified procedure for reduced authentication times for shared-media network migration in accordance with one or more embodiments described herein, particularly from the perspective of a network node 125. The procedure 1300 may start at step 1305, and continues to step 1310, where, as described in greater detail above, a node (e.g., node 23) joins (or migrates to) a current FAR/network. (Notably, the migration to a particular FAR may be selected based on having the key for that FAR already, as described above.) If in step 1315 the node does not already have an up-to-date mesh security key, then in step 1320 the node is forced to obtain the corresponding mesh security key, which is a time consuming process. However, based on the techniques above, the node may, in fact, have an up-to-date key in step 1315, and as such, in step 1325 may use that up-to-date (e.g., updated) mesh security key with the new FAR/network.

Note that in step 1330, the node continues to maintain the mesh security key for previously joined FARs, and if there is an updated key in step 1335 for one or more particular FARs of the previously joined FARs for the node (a decision driven by the management device as in procedure 120 above), then in step 1340 the node may correspondingly receive the updated mesh security key, such as where the node is still within the managing device's database 600 as being associated with that particular FAR. If deciding again to migrate in step 1345, then the procedure 1300 may return to step 1310 to join the selected FAR/network. Otherwise, the procedure may return to step 1035 to continue to possibly receive updated keys, accordingly.

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

The techniques described herein, therefore, provide for reduced authentication times for shared-media network migration. In particular, the techniques herein provide an automated way to achieve faster migration without adding load on the network servers (e.g., AAA servers), and without requiring error-prone manual configuration. In addition, the database generated herein may be used to show network-migration patterns, which can be used for various other purposes such as network analysis, capacity planning, radio frequency planning, etc. Further, the techniques herein improve applications (e.g., distribution-automation) where it is important to be able to send messages without the added latency that would otherwise be involved during conventional re-authentication.

Note that the techniques herein do not take away anything from current shared-media (mesh) security schemes and is based on existing standards. That is, the techniques herein use existing security mechanisms, but now dynamically update those nodes, which have already been authenticated, with new keys that may have been updated while those nodes are not currently joined to a particular FAR/network.

Note further that the database 600 that is created after monitoring the network transitions/migrations for a period of time may be of particular value, as well. For instance, the database may be exported to a management application (e.g., a simple list, or other processing program), for example, so administrators or customers can use the data to assess the current network, network capacity, shared-media (e.g., wireless) planning, monitoring the migration statistics, etc.

While there have been shown and described illustrative embodiments that provide is for reduced authentication times for shared-media network migration, it is to be understood that various other adaptations and modifications may be made within the spirit and scope of the embodiments herein. For example, the embodiments have been shown and described herein with relation to field area networks (FANs) or LLNs, and FARs or root nodes, respectively. However, the embodiments in their broader sense are not as limited, and may, in fact, be used with any type of shared-media network and/or protocol where nodes migrate between networks and use security keys. In addition, while certain protocols are shown, such as RPL or 802.1x-based authentication, other suitable protocols may be used, accordingly. Also, while the techniques generally describe database management by an NMS 150, other devices with visibility to each FAR in the computer network may also be used to provide intelligence to the network functions described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining when nodes of a computer network join any one of a plurality of field area routers (FARs), which requires a shared-media mesh security key for that joined FAR;
   maintaining a database that indicates to which FAR each node in the computer network is currently joined, and to which FARs, if any, each node had previously joined, wherein the nodes are configured to maintain the mesh security key for one or more previously joined FARs in order to return to those previously joined FARs with the maintained mesh security key; and
   in response to an updated mesh security key for a particular FAR of the plurality of FARs, distributing the updated mesh security key to nodes having previously joined that particular FAR that are not currently joined to that particular FAR.

2. The method as in claim 1, further comprising:
   limiting the distributing to specific nodes having previously joined that particular FAR within a specified past time period.

3. The method as in claim 1, further comprising:
   limiting the distributing to specific nodes having previously joined that particular FAR for greater than a certain portion of their active time.

4. The method as in claim 1, further comprising:
   maintaining, within the database, what portion of active time each node has spent joined to particular FARs.

5. The method as in claim 4, further comprising:
   disassociating a lesser-used FAR from a particular node within the database in response to a portion of active time that particular node has spent joined to the lesser-used FAR being less than a configured portion.

6. The method as in claim 1, further comprising:
   maintaining, within the database, what portion of total joins each node has joined particular FARs.

7. The method as in claim 1, further comprising:
   exporting the database to a management application.

8. The method as in claim 1, wherein one or more of the nodes in the computer network are stationary nodes that migrate between FARs based on varying network conditions.

9. The method as in claim 1, wherein determining comprises:
receiving a notification from a joined FAR.

10. The method as in claim 1, wherein determining comprises:
receiving a notification from a joining node.

11. The method as in claim 1, wherein determining comprises:
inferring when nodes join a FAR based on implicit notification.

12. The method as in claim 1, further comprising:
in response to determining that a particular node has been evicted from the computer network, removing the particular node from the database.

13. A method, comprising:
maintaining, by a node in a computer network, a respective shared-media mesh security key for one or more previously joined field area routers (FARs) when migrating to a current FAR in order to return to those previously joined FARs with the maintained mesh security key;
receiving an updated mesh security key for a particular FAR of the previously joined FARs, the updated mesh security key received from a management device configured to maintain a database that indicates to which FAR each node in the computer network is currently joined, as well as to which FARs, if any, each node had previously joined; and
migrating back to the particular FAR using the updated mesh security key.

14. The method as in claim 13, further comprising:
selecting the particular FAR for migration based on having an up-to-date mesh security key for the particular FAR.

15. The method as in claim 13, wherein the node is stationary, the method further comprising:
selecting the particular FAR for migration based on varying network conditions.

16. An apparatus, comprising:
one or more network interfaces to communicate in a computer network;
a processor coupled to the network interfaces and adapted to execute one or more processes; and
a memory configured to store a process executable by the processor, the process when executed operable to:
determine when nodes of a computer network join any one of a plurality of field area routers (FARs), which requires a shared-media mesh security key for that joined FAR;
maintain a database that indicates to which FAR each node in the computer network is currently joined, and to which FARs, if any, each node had previously joined, wherein the nodes are configured to maintain the mesh security key for one or more previously joined FARs in order to return to those previously joined FARs with the maintained mesh security key; and
distribute, in response to an updated mesh security key for a particular FAR of the plurality of FARs, the updated mesh security key to nodes having previously joined that particular FAR that are not currently joined to that particular FAR.

17. The apparatus as in claim 16, wherein the process when executed is further operable to:
limit the distributing to specific nodes having previously joined that particular FAR within a specified past time period.

18. The apparatus as in claim 16, wherein the process when executed is further operable to:
limit the distributing to specific nodes having previously joined that particular FAR for greater than a certain portion of their active time.

19. The apparatus as in claim 16, wherein the process when executed is further operable to:
maintain, within the database, what portion of active time each node has spent joined to particular FARs.

20. An apparatus, comprising:
one or more network interfaces to communicate in a computer network;
a processor coupled to the network interfaces and adapted to execute one or more processes; and
a memory configured to store a process executable by the processor, the process when executed operable to:
maintain a respective shared-media mesh security key for one or more previously joined field area routers (FARs) when migrating to a current FAR in order to return to those previously joined FARs with the maintained mesh security key;
receive an updated mesh security key for a particular FAR of the previously joined FARs, the updated mesh security key received from a management device configured to maintain a database that indicates to which FAR each node in the computer network is currently joined, as well as to which FARs, if any, each node had previously joined; and
migrate back to the particular FAR using the updated mesh security key.

21. The apparatus as in claim 20, wherein the process when executed is further operable to:
select the particular FAR for migration based on having an up-to-date mesh security key for the particular FAR.

22. The method as in claim 20, wherein the node is stationary, the method further comprising:
select the particular FAR for migration based on varying network conditions.

* * * * *